United States Patent [19]
Owaki

[11] Patent Number: 5,627,895
[45] Date of Patent: May 6, 1997

[54] ELECTRONIC DEVICE FOR DETECTING SELECTED VISUALLY PERCEPTIBLE INDICATION INFORMATION ON AN INFORMATION STORAGE MEDIUM FOR SECURITY COMPARISON

[75] Inventor: Hidetaka Owaki, Tokyo, Japan

[73] Assignee: Sega Enterprises, Ltd., Japan

[21] Appl. No.: 360,812

[22] PCT Filed: Sep. 5, 1994

[86] PCT No.: PCT/JP94/01463

§ 371 Date: Mar. 28, 1995

§ 102(e) Date: Mar. 28, 1995

[87] PCT Pub. No.: WO95/14993

PCT Pub. Date: Nov. 29, 1993

[51] Int. Cl.[6] .................................................. H04L 9/00
[52] U.S. Cl. .................................................. 380/54; 380/4
[58] Field of Search ..................................... 380/4, 54

[56] References Cited

U.S. PATENT DOCUMENTS

| | | | |
|---|---|---|---|
| 4,785,361 | 11/1988 | Brothby | 380/4 |
| 4,967,286 | 10/1990 | Nomula et al. | |
| 5,027,396 | 6/1991 | Platteter et al. | 380/4 |
| 5,233,436 | 8/1993 | Oskman et al. | 380/54 |
| 5,418,852 | 5/1995 | Itami et al. | 380/4 |

FOREIGN PATENT DOCUMENTS

| | | |
|---|---|---|
| 9101358 | 8/1991 | European Pat. Off. . |
| 545472 | 6/1993 | European Pat. Off. . |
| 553545 | 8/1993 | European Pat. Off. . |
| 643391 | 3/1995 | European Pat. Off. . |
| 4-259958 | 9/1992 | Japan . |
| 2250626 | 11/1991 | United Kingdom . |

*Primary Examiner*—Salvatore Cangialosi
*Attorney, Agent, or Firm*—Dickstein Shapiro Morin & Oshinsky LLP

[57] ABSTRACT

The electronic device, such as the game device, which can reduce a reading time of reading visually recognizable indication information formed in a CD-ROM, and which can ensure the security and effectively reject or exclude counterfeit products, is provided. The electronic device comprises a CD-ROM mounting unit on which a CD-ROM 12 having visually recognizable indication information is to be mounted; an information detection unit 18 detecting specific information selected out of unit information constituting the indication information; and a comparison unit 19 which stores base data D corresponding to data A to be compared, the comparison unit 19 comparing the specific information with the data A to be compared corresponding to the base data D and generating an output of the compared result.

32 Claims, 11 Drawing Sheets

ELECTRONIC DEVICE FOR DETECTING SELECTED VISUALLY PERCEPTIBLE INDICATION INFORMATION ON AN INFORMATION STORAGE MEDIUM FOR SECURITY COMPARISON

TECHNICAL FIELD

The present invention relates to an electronic device for reading information stored in an information storage medium and more, particularly, an information processing device for optically reading program information stored in a CD-ROM to play a game.

BACKGROUND ART

Musical CDs and data information CD-ROMs can be reproduced by CD drives as long as they meet standards even if they are counterfeits. This does not cease counterfeit manufacturers. As a countermeasure to this, various security systems have been proposed for the prevention of unauthorized copying game softwares which have been developed as results of large investments of a large number of man powers and much time.

A new security system for CD-ROMs are proposed in Japanese Patent Application No. Hei 05-185740/1993, and International Application PCT/JP 94/01243 filed based on the priority claimed from the Japanese patent application. This security system detects whether or not specific indications, such as trademarks or others, are indicated at predetermined parts of CD-ROM discs, whereby the discs are judged to be genuine products or counterfeits.

In the security system proposed in the above-described applications, when a specific indication is read, the entire specific indication is read, which unavoidably requires a certain reading time. Especially in a case that a specific indication is visibly displayed on an information storage surface with using a group of pits over a plurality of tracks, all said tracks have to be read, which takes much reading time.

One object of the present invention is to provide an electronic device with a new security system built in, which can effectively reject or exclude counterfeit products.

Another object of the present invention is to provide an electronic device and an information processing method which can reduce a reading time of reading a specific security indication.

Another object of the present invention is to provide an electronic device and an information processing method which provides added security against counterfeiting.

Another object of the present invention is to provide an electronic device and an information processing method which can effectively expel or exclude counterfeit information storage mediums from the market even when security systems are released.

Still another object of the present invention is to provide an information processing method which can effectively reject or exclude use of counterfeit information storage mediums.

DISCLOSURE OF INVENTION

The electronic device according to one embodiment of the present invention comprises a medium mounting unit on which an information storage medium having visually recognizable indication information is to be mounted, a detection unit for detecting specific information selected out of unit information constituting the indication information, and an output unit having reference information corresponding to the indication information, said output unit comparing the specific information with comparison information in the reference information corresponding to the specific information and generating an output of the compared result.

According to this embodiment, all of information of an indication for the security check is not required to be detected. Thereinstead, information of a selected part of the indication is detected, whereby a reading time of information of the indication can be short.

The electronic device according to another embodiment of the present invention is characterized in that said detection unit includes a selection unit selecting at random the specific information out of the unit information.

According to this embodiment, the specific part to be selected from a unit information constituting the indication information is changed at random for every read out, so that when a counterfeiter makes an information storage medium agreeable or compatible to the electronic device of the present invention, he has to illegally use the same indication as indication information born by an authentic information storage medium. Counterfeits can be more effectively expelled.

The CD-ROM device according to still another embodiment of the present invention comprises a CD-ROM mounting unit on which a CD-ROM having visually recognizable indication information is to be mounted, a detection unit for detecting specific information selected at random out of unit information constituting the indication information, and an output unit having reference information corresponding to the indication information, said output unit comparing the specific information with comparison information in the reference information corresponding to the specific information and generating an output of the compared result.

According to this embodiment, all of information of an indication for the security check born by a CD-ROM is not requested to be detected, but only a specific selected part of the indication is detected, whereby a time required for reading out the indication information can be made short. Furthermore, because a specific selected part to be read out of the indication is randomly changed by the detection unit for every reading out a counterfeiter, who wants to make a CD-ROM software compatible to an authentic CD-ROM player, should have to illegally use the same indication as that born on an authentic CD-ROM. Thus, counterfeits can be more effectively expelled.

The electronic device according to still another embodiment of the present invention comprises a disc mounting unit on which is to be mounted a disc having an information recording region with information recorded with pits and a predetermined region defined over a plurality of tracks, a detection unit for detecting information in specific tracks selected out of said plurality of tracks, a storing unit storing reference information corresponding to a specific indication, and a judging unit comparing information obtained from the specific tracks with the reference information to judge whether or not the specific indication is indicated in the predetermined region.

According to this embodiment, a time required for reading out a specific indication can be shortened, because it is not required to detect all of a plurality of tracks defined for the security check, but required to detect only a selected few specific ones.

The electronic device according to still another embodiment of the present invention comprises a disc mounting unit on which is to be mounted a disc having a region with program information recorded with pits, a predetermined region defined over a plurality of tracks, and a region with a specific indication visually recognizably formed with an aggregation of pits within the predetermined region, a detection unit detecting information out of specific tracks selected from said plurality of tracks, a storing unit for storing reference information corresponding to the specific indication, and a comparison unit comparing information obtained from the specific tracks with the reference information.

According to this embodiment, a specific indication for the security check is indicated over a plurality of tracks, but for the security check, information is detected from specific selected tracks, whereby a time required for reading the specific indication can be shortened.

The electronic device according to still another embodiment of the present invention is characterized in that said detecting unit includes a selection unit selecting at random the specific tracks out of said plurality of tracks.

According to this embodiment, because specific tracks to be detected for the security check are changed at random by the detecting unit for every reading out, a counterfeiter, who wants fabricate an information storage medium agreeable or compatible to the authentic electronic device, has to illegally indicate the same indication as the specific indication born or authentic information storage mediums.

The information processing device according to still another embodiment of the present invention comprises a storing unit storing reference information corresponding to a specific indication, the use of which is legally prohibited to a person other than those authorized, a disc mounting unit on which is to be mounted a disc having an information recording region with information recorded with pits, and a predetermined region defined over a plurality of tracks, a selection unit selecting specific tracks at random out of said plurality of tracks, a detection unit optically detecting information recorded with pits in the specific tracks, a comparison unit comparing the information obtained from the specific tracks with the reference information, and a reading unit for reading the information in the information recording region in response to an output from the comparison unit when the information obtained from the specific tracks agrees to the information in the reference information corresponding to the specific tracks.

According to this embodiment, information is detected only from specific tracks for the security check, whereby a time required for reading out a specific indication can be made shortened. In addition, specific tracks are changed at random for every security check, so that a counterfeiter should have to indicate the same indication as a specific indication born on the authentic discs. Illegal indication can be legally accused, whereby counterfeits can be very effectively expelled.

The electronic device according to still another embodiment of the present invention comprises a reference information storing unit for storing reference information, a disc mounting unit on which is to be mounted a disc having an information recording zone with information recorded with pits, an indication forming zone defined at part different from the information storing zone, and a plurality of indication regions defined in the indication forming zone, a selecting unit selecting at random a specific indication region out of the plurality of indication regions, a detection unit optically detecting indication information recorded with pits in the specific indication region selected at random, and a comparison unit comparing the indication information detected out of the specific indication region with the reference information, and a control unit operable in response to an output from the comparison unit.

According to this embodiment, a plurality of indication regions of a disc are detected for the security check, so that the security is further ensured. In addition, a required detection time is made shortened while the security is further ensured, because it is not required to detect all of the plural indication regions, but required to detect only a specific indication region selected at random.

The electronic device according to still another embodiment of the present invention is characterized in that said selecting unit selects at random specific tracks out of a plurality of tracks forming the specific indication region, and said comparison unit compares the information detected from the specific track with the reference information.

According to this embodiment, because little data is detected for the security check out of selected specific tracks which are also selected from a selected specific indication region, increase in read time is suppressed while the security is much improved, whereby counterfeits can be very effectively expelled.

The information processing method according to one embodiment of the present invention comprises the steps of detecting specific information selected out of unit information which is visually recognizably indicated on an information storage medium, and comparing the selected specific information with reference information corresponding to said unit information.

According to this embodiment, a time required for reading out the indication information can be shortened, because it is not required to detect all of information for the security check required to detect only but a selected specific part of information.

The information processing method according to another embodiment of the present invention is characterized in that the detection of the specific information is conducted by selecting at random the specific information out of the unit information.

According to this embodiment, a specific part to be selected from unit information of indication is changed at random for every read out. A counterfeiter, who wants to make an information storage medium which can be read by the information processing method of the present invention, should have to illegally indicate the same indication as indicated on an authentic information storage medium. Counterfeiting can thus be further effectively expelled.

BRIEF DESCRIPTION OF DRAWINGS

FIG. 3 is a plan view of a CD-ROM which the security check system according to the present invention is applied to.

FIG. 5 is a partial sectional view of the CD-ROM which the security check according to the present invention is applied to.

FIGS. 6A–6C are views detailing formation of an indication the security check according to the present invention is applied to.

FIGS. 10A–10D are plan views of other examples of the CD-ROM which the security check according to the present invention is applied to.

BEST MODE FOR CARRYING OUT THE INVENTION

A game machine including the electronic device according to one embodiment of the present invention will be explained with reference to the drawings.

Figure 1:
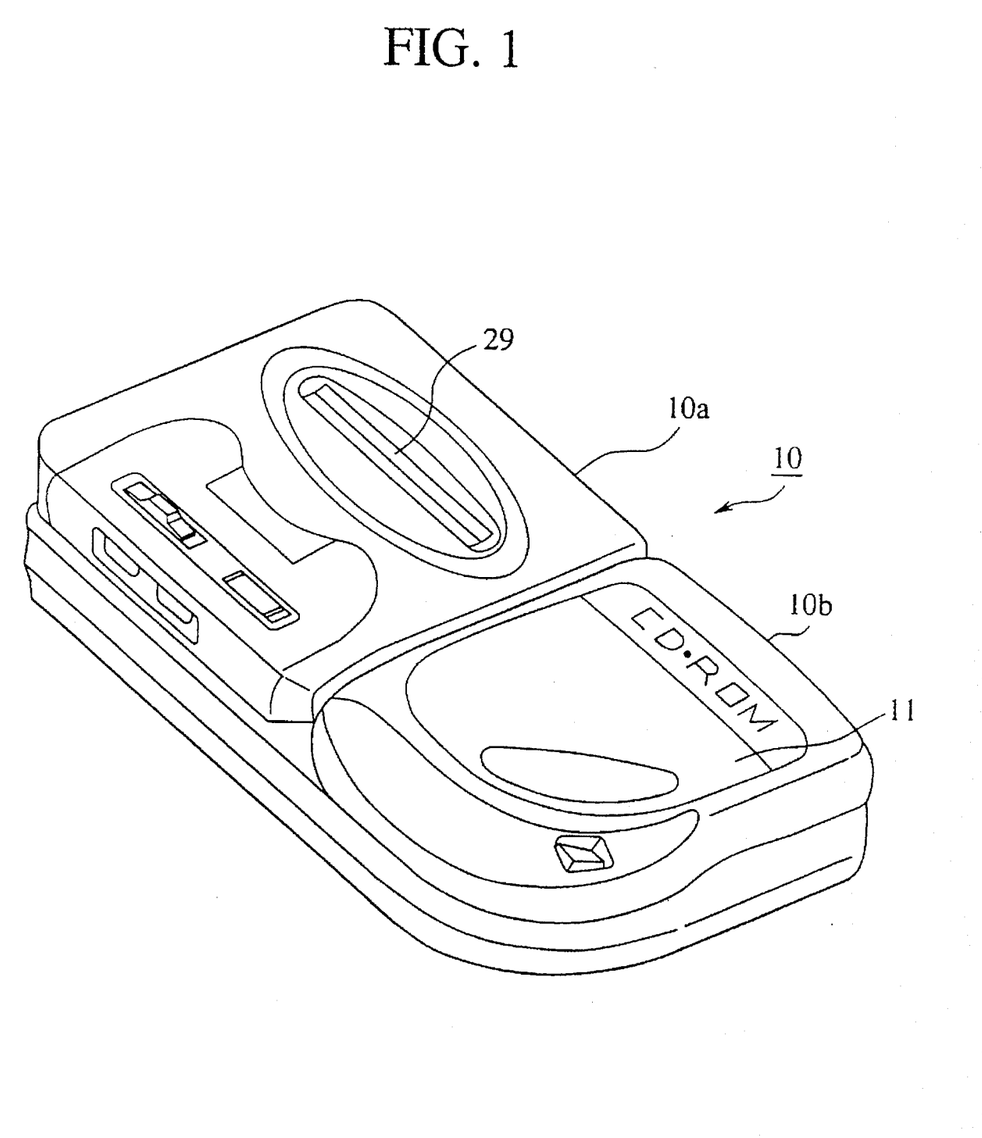
FIG. 1 is a perspective view of a game machine incorporating the security check system according to the present invention.
Figure 2:
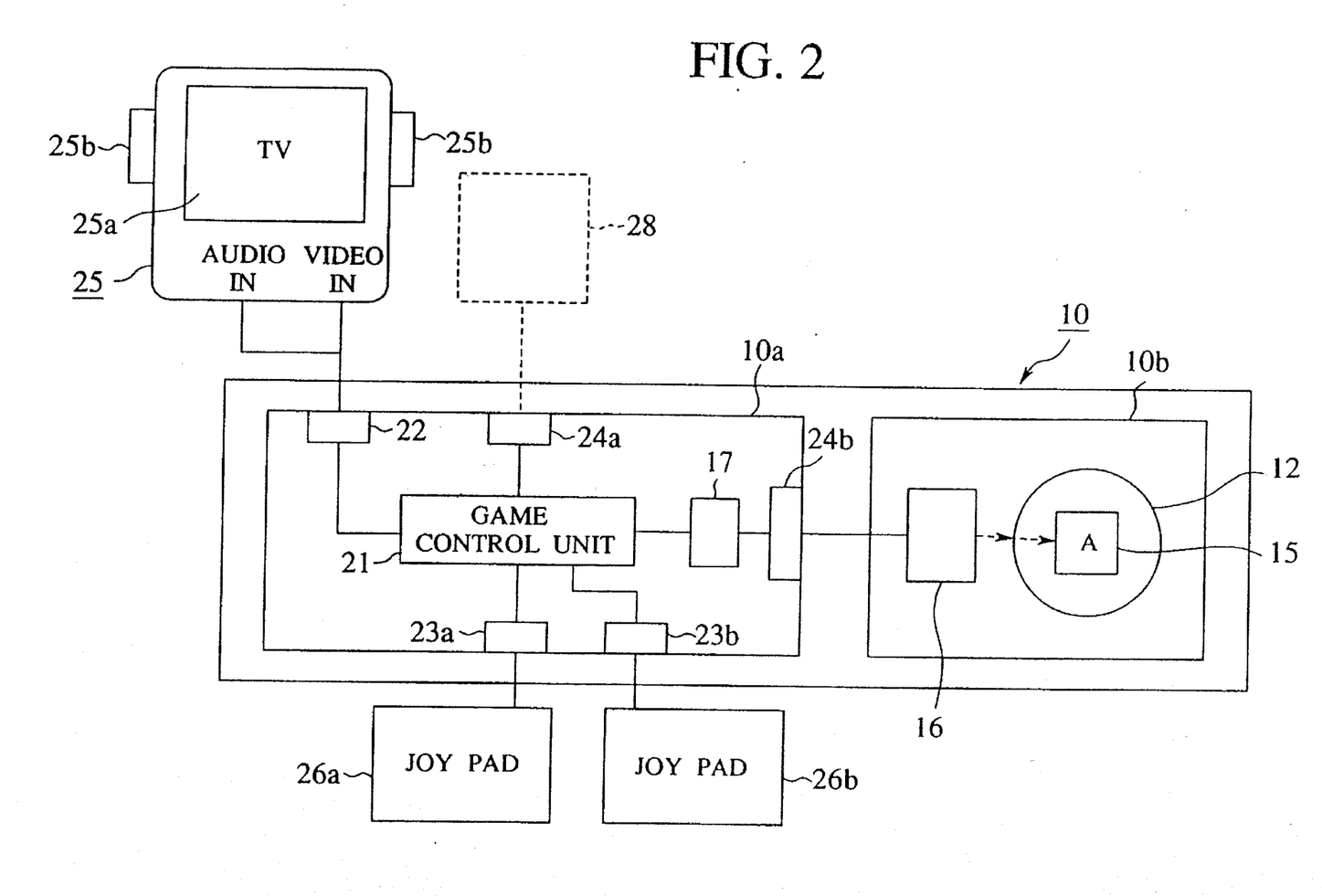
FIG. 2 is a block diagram of the game machine incorporating the security check system according to the present invention.

As shown in FIGS. 1 and 2, a game machine 10 includes a control unit 10a and a CD-ROM control unit 10b. The control unit 10a includes a game control unit 21 for controlling a game, an output interface 22 for supplying audio signals and video signals, input interfaces 23a, 23b for receiving operational signals, and input/output interfaces 24a, 24b for receiving/supplying a game program and data.

The output interface 22, the input interfaces 23a, 23b, and the input/output interfaces 24a, 24b are connected to the game control unit 21.

As shown in FIG. 2, the control unit 10a is connected to a television unit 25 as a display unit for displaying contents of a game, and to various controllers, e.g., joy pads 26a, 26b, for manipulating proceeding of the game through the input interfaces 23a, 23b.

Thus the game machine comprises the game machine body 10, the television unit 25, the joy pads, etc. The numeral 10 refers herein to the main body of the game machine. The numeral 10 sometimes may refer in general to a game machine to which peripherals such as a joy stick are connected.

The game machine 10 receives a game cartridge 28 in a cartridge receiver 29 of the control unit 10a and can conduct a game in accordance with a game program stored in a semiconductor ROM or RAM of the game cartridge 28. The game program stored in the semiconductor ROM or RAM is transmitted to the game control unit 21 through the input/output interface 24a.

The CD-ROM control unit 10b includes a CD-ROM mount or drive unit 11 and an optical pickup 16. A CD-ROM 12 is mounted on the CD-ROM mount 11, so that program information stored in the CD-ROM 12 is detected by the optical pickup 16.

When the program information recorded in the CD-ROM 12 is a game program, the read game program information is supplied to the game control unit 21 through the input/output interface 24a, and the game is ready for conducting.

The game cartridge 28 and the CD-ROM 12 function as information storing medium, and the cartridge port or receiver 29 and the CD-ROM mount unit 11 function as a medium port.

Figure 3:
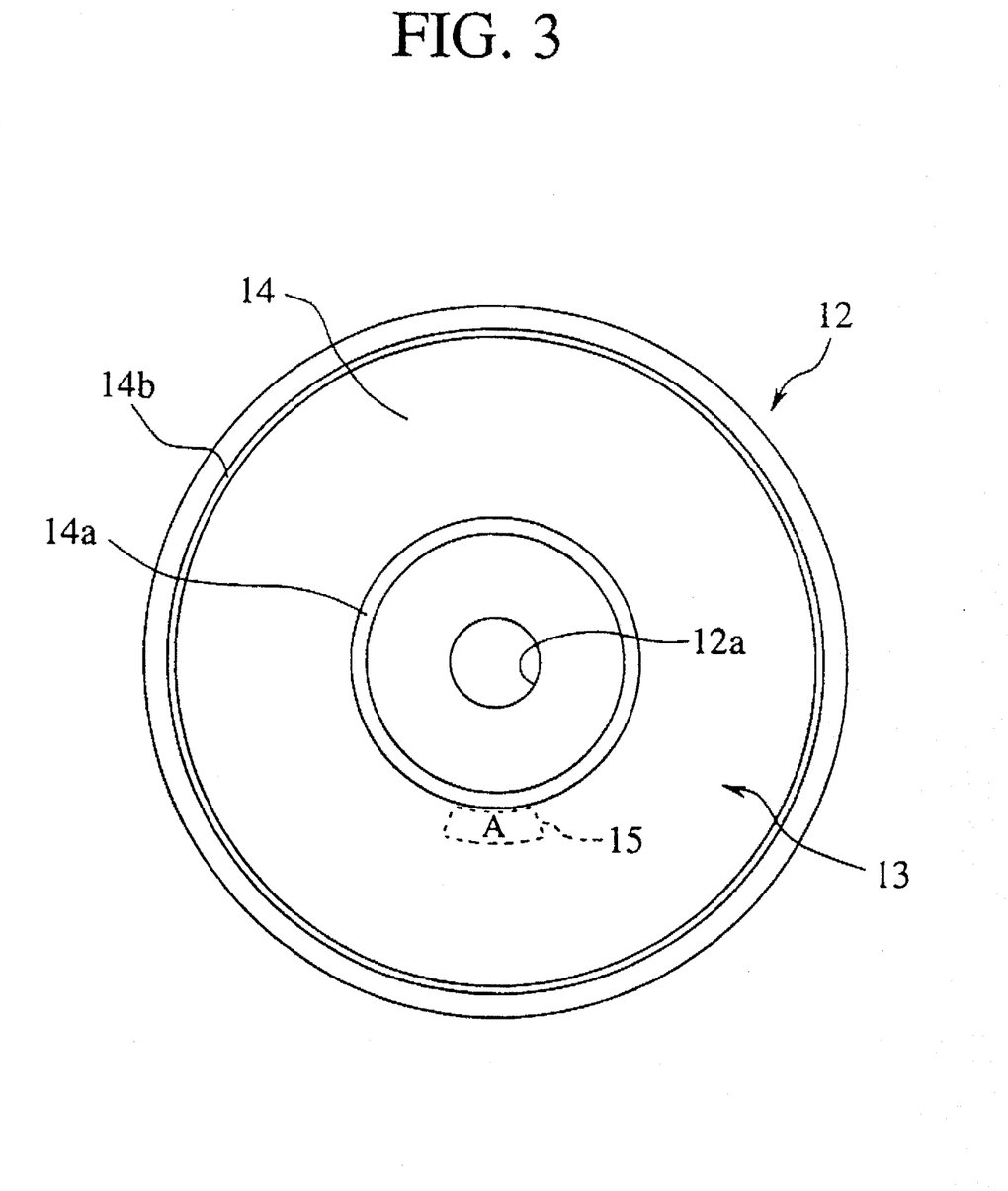

The CD-ROM 12 is formed in a disk as shown in FIG. 3 of thin transparent plastics and has a center hole 12a formed in the center of the disc.

The plastic substrate 13 of the CD-ROM 12 has a program region 14 with a game program information recorded with pits between a read-in region 14a and a read-out region 14b. The program region 14 which is an information recorded region has a trademark indication region 15 defined in a rectangular area over 100–200 tracks adjacent to the read-in region 14a without game program information recorded. In this specification, the region 15 may be referred to as "trademark indication region", "indication region" or "predetermined region/part".

In the trademark indication region 15 data A to be compared which is a specific indication (see FIG. 4) is provided. The data A to be compared is formed with a set of pits and is recognized as pit array information when read by the optical pickup 16 provided in the CD-ROM control unit 10b.

Figure 4:
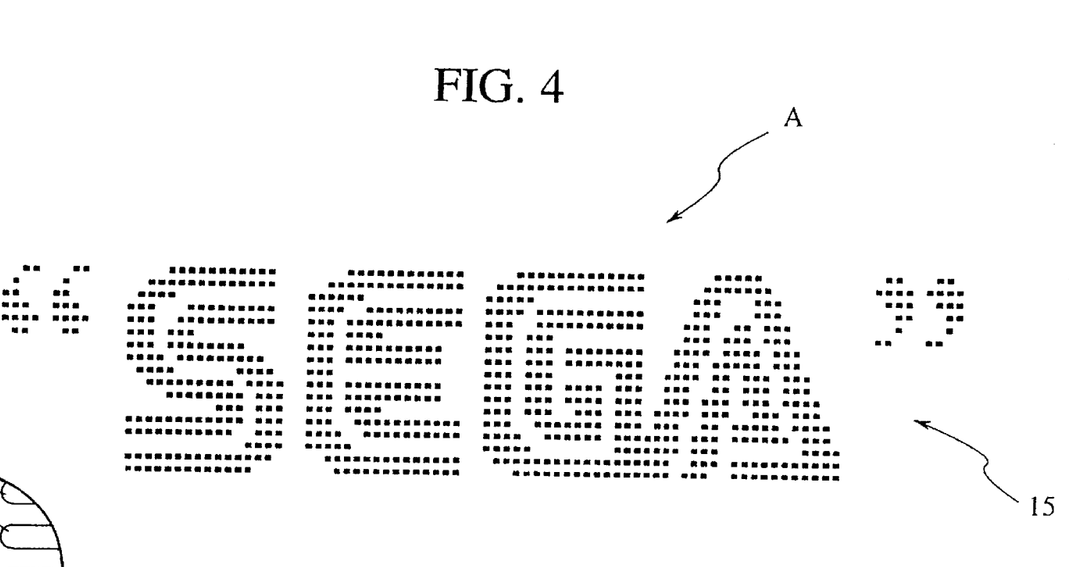
FIG. 4 is a view of one example of indications on the CD-ROM to be security-checked.
Figure 4A:
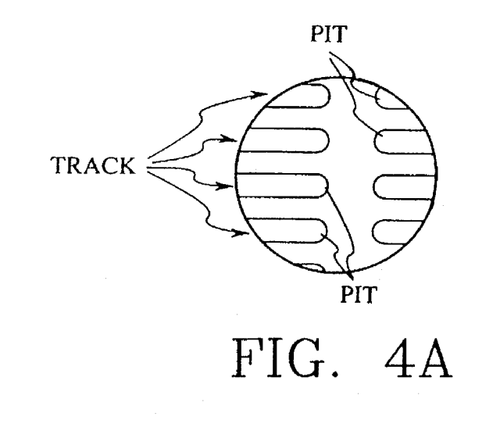

The data A to be compared is indication information stored in the trademark indication region 15 which is visually recognizable, and can be, in addition to a trademark, a mark, logotype, a pattern, character or others.

Figure 5:
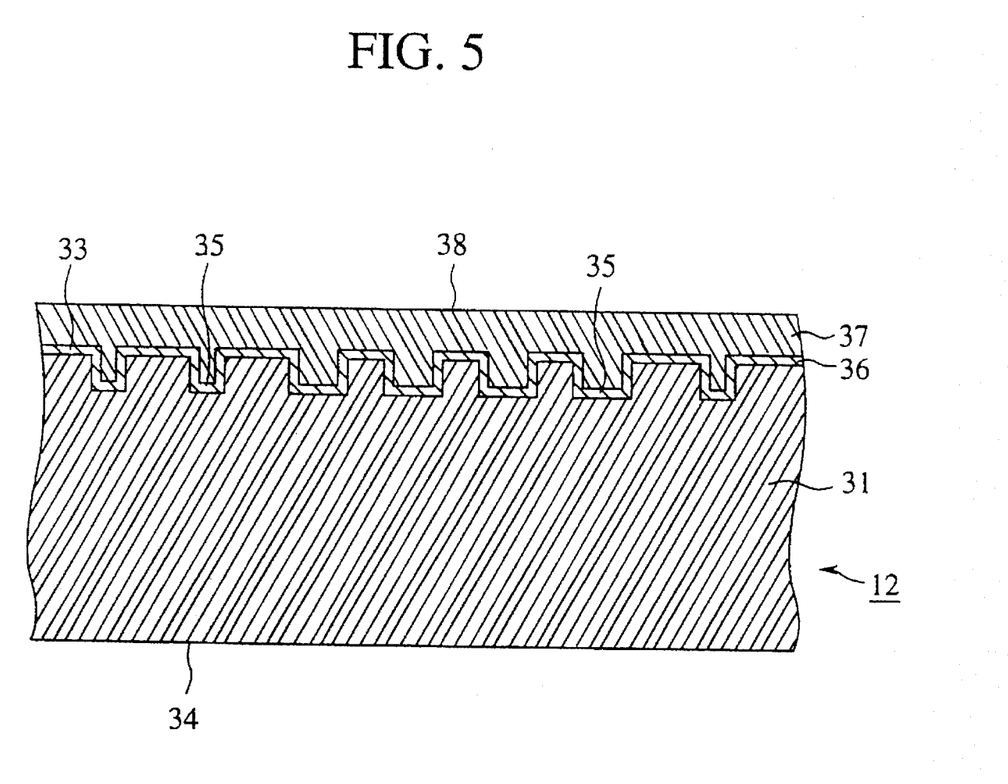

As shown in FIG. 5, the CD-ROM 12 stores image information in the form of a set of pits together with game program information in the form of a group of pits 35 in the upper side of the disc substrate 31 of transparent plastics, such as polycarbonate, acryl, vinyl polychloride or others.

The upper side 33 with the pits 35 formed is covered with a reflecting layer 36 which is a metal layer of aluminium or others, and is covered further with a protection layer 37, whereby an outer surface 38 is formed. The protection layer 37 is usually formed of an opaque material, and a title, a design and an author of a game software, and a trademark, etc. designated by a licenser in a case that production of the game software is licensed by a third party can be indicated in the outer surface 38.

The information stored in the CD-ROM 12 is read by causing a laser beam to enter into the disc substrate 31 from the underside surface 34 thereof and reflect at the reflection layer 36 to be detected by the optical pickup 16 disposed facing the underside surface 34. A set of pits in the trademark indication region 15 is formed to be recognizable as a required shape visually from the underside surface 34, which is an optical detecting surface.

A method for forming data A to be compared using pits will be explained with reference to FIGS. 6A to 6C.

Figure 6A:
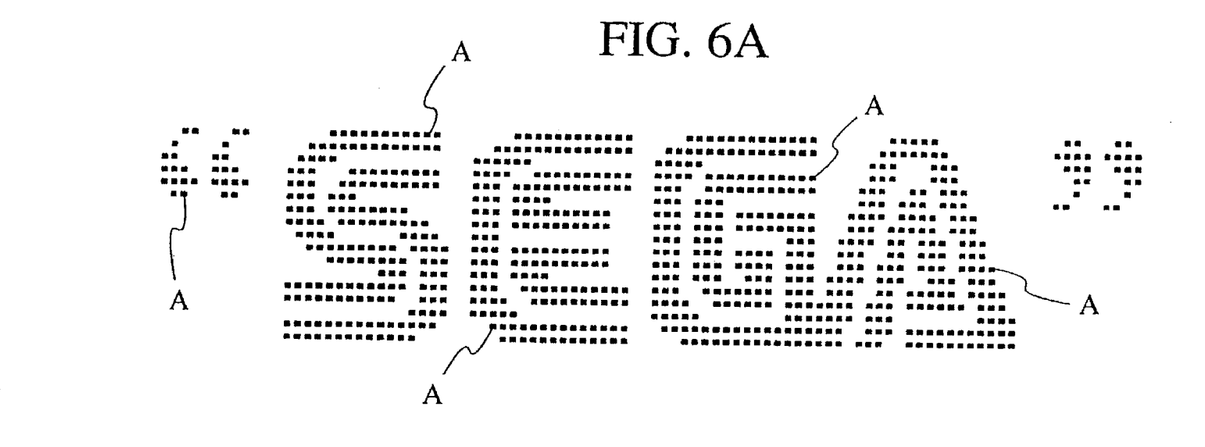

A data A to be compared, e.g., "SEGA", is formed in a set of pits as shown in FIG. 6A. The data A to be compared is visible (visually recognizable as a mark "SEGA") from the underside surface 34, the optical detecting surface, of the disc substrate 31, as shown in FIG. 5.

Figure 6B:
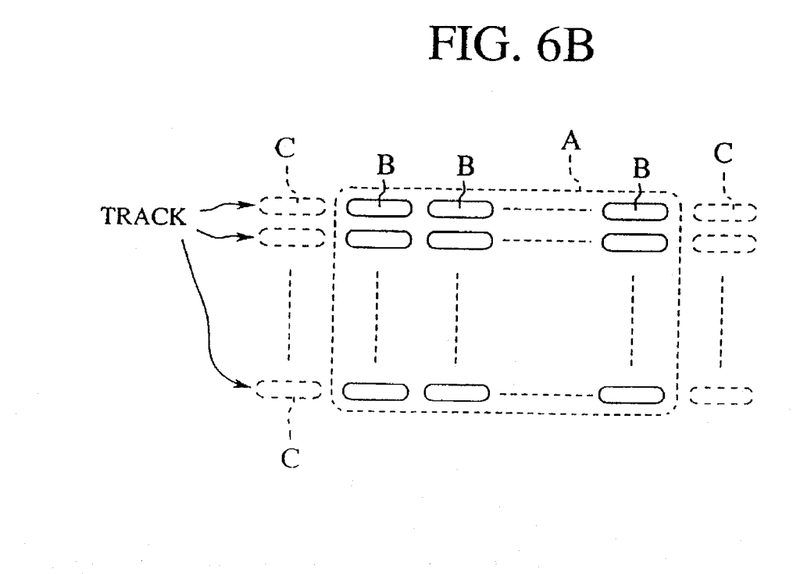

Each dot making up the letters "SEGA" comprises a set of pit arrays enclosed by the broken line A in FIG. 6B, and the part with no letters comprises a set of pit arrays C in FIG. 6B. For example, a region enclosed by the broken line A is formed in one visible dot by longitudinally 70 tracks and transversely 12 pit arrays. For example, the pit arrays B provides a unit at which areas covered with pits are made a maximum as shown in FIG. 6C (A), and the pit arrays C provides a unit at which areas covered with pits are made a minimum as shown in FIG. 6C (B).

Such dots are arranged at required positions to form letters. The letters, e.g., "SEGA" in FIG. 6A are formed in the trademark indication region 15 defined over substantially 1000 tracks.

Figure 6C:
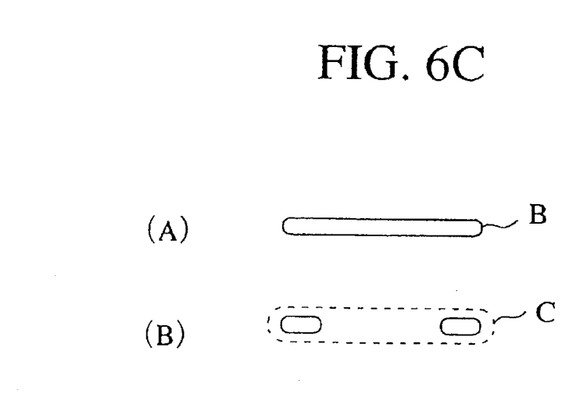
Figure 7:
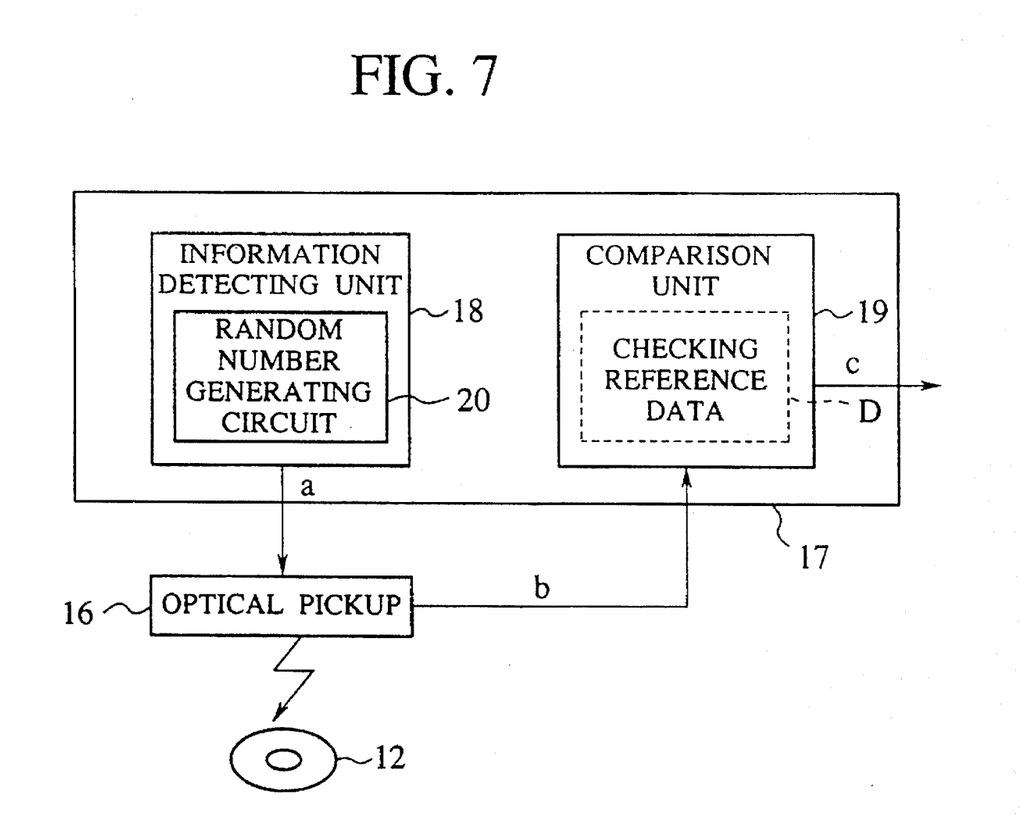
FIG. 7 is a block diagram of a reading unit for executing the security check according to the present invention.

In FIGS. 6A to 6C, an indication in the predetermined region 15 of the disc substrate 31 is formed visible (readable or recognizable) as letters from the underside surface 34 which is the optical detecting surface (see FIG. 5), but may be formed visible from the upper surface 38 opposite to the optical detecting surface (see FIG. 5). In FIG. 5, it is possible that the protection layer 37 is formed of a transparent material so that a specific indication can be visible from the outer surface 38. As shown in FIG. 2, the game machine 10 includes a reading unit 17. The unit 17 is connected to the optical pickup 16 through the input/output interface 24b. As shown in FIG. 7, the unit 17 includes an information detecting unit 18, and a comparison unit 19. The information detecting unit 18 includes a random number generating circuit 20 which functions as a selection unit.

The information detecting unit 18 controls reading positions of the optical pickup 16 with respect to the CD-ROM 12, and generates outputs of detection signals (a) commanding the optical pickup to read specific tracks which are located in the trademark indication region 15 and are to be compared. The specific tracks are selected at random out of a plurality of tracks which are composed of pit arrays forming comparison data A. The selection is determined by a random number generated by the random number generating circuit 20.

That is, the optical pickup 16 selects and reads specific pit arrays which are specific information out of pit arrays which indicates a plurality of unit information.

The pit array information (b) read from the specific tracks are supplied to the comparison unit 19.

Specific tracks to be read by the optical pickup 16 can be obtained by selecting several units at which one track is defined as a unit, and also may be obtained by selectively several units at which a plurality of tracks are defined as a unit.

Figures 8, 8A:
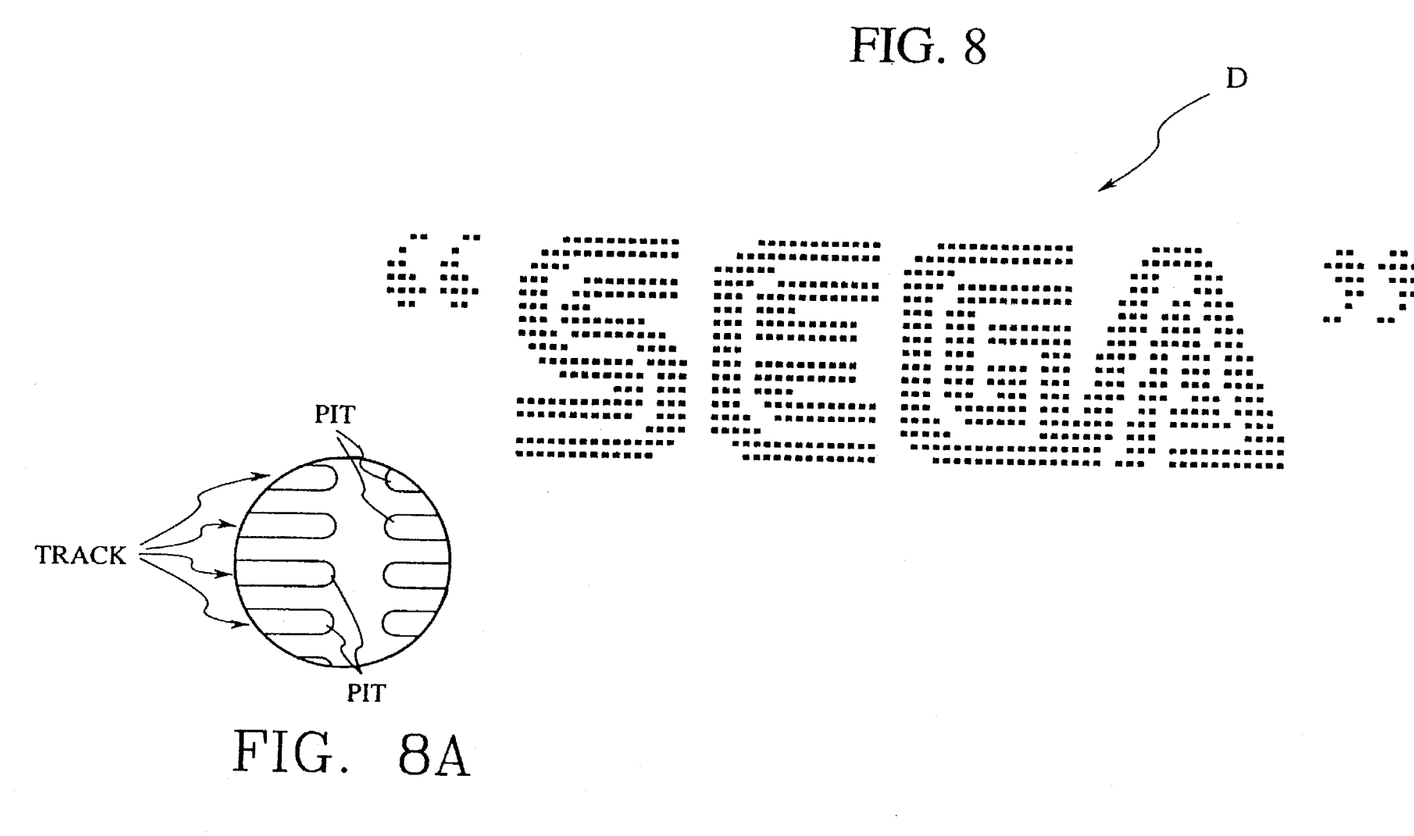
FIG. 8 is a view explaining an original data for checking as a reference for comparison.

The comparison unit 19 stores base data D (see FIG. 8) as digital signals in a semiconductor ROM. The base data D is reference information or standard information for judging agreement of data A therewith. The base data D correspond to a reference indication such as the specific indication "SEGA" as shown in FIG. 8. The digital reference data corresponding to the specific indication "SEGA" are stored in a semiconductor ROM in which a reference unit is a set of data corresponding to each track consisting of a set of pits. The specific indication A is formed on the CD-ROM disc as the same group of pits as the reference indication D. The specific indication A to be compared is detected at its selected tracks in which a comparison unit is a respective track consisting of a set of pits.

When the comparison has found that the data A to be compared and the reference data D agree with each other, it is judged that the specific indication is indicated in the region, and when the comparison has found that the data to be compared A and the reference data D disagree with each other, it is judged that the specific indication is not displayed in the predetermined region.

The comparison unit 19 generates comparison result information (c) as a comparison result.

That is, the comparison unit 19 functions as a storage for storing base or reference data corresponding to the specific indication D; as an output unit for comparing data to be compared, which are indicative of comparison pit array information of a specific indication A, with the reference data and generating an output based on the comparison result; and as a judging unit for judging whether or not the specific indication is displayed.

Figure 9:
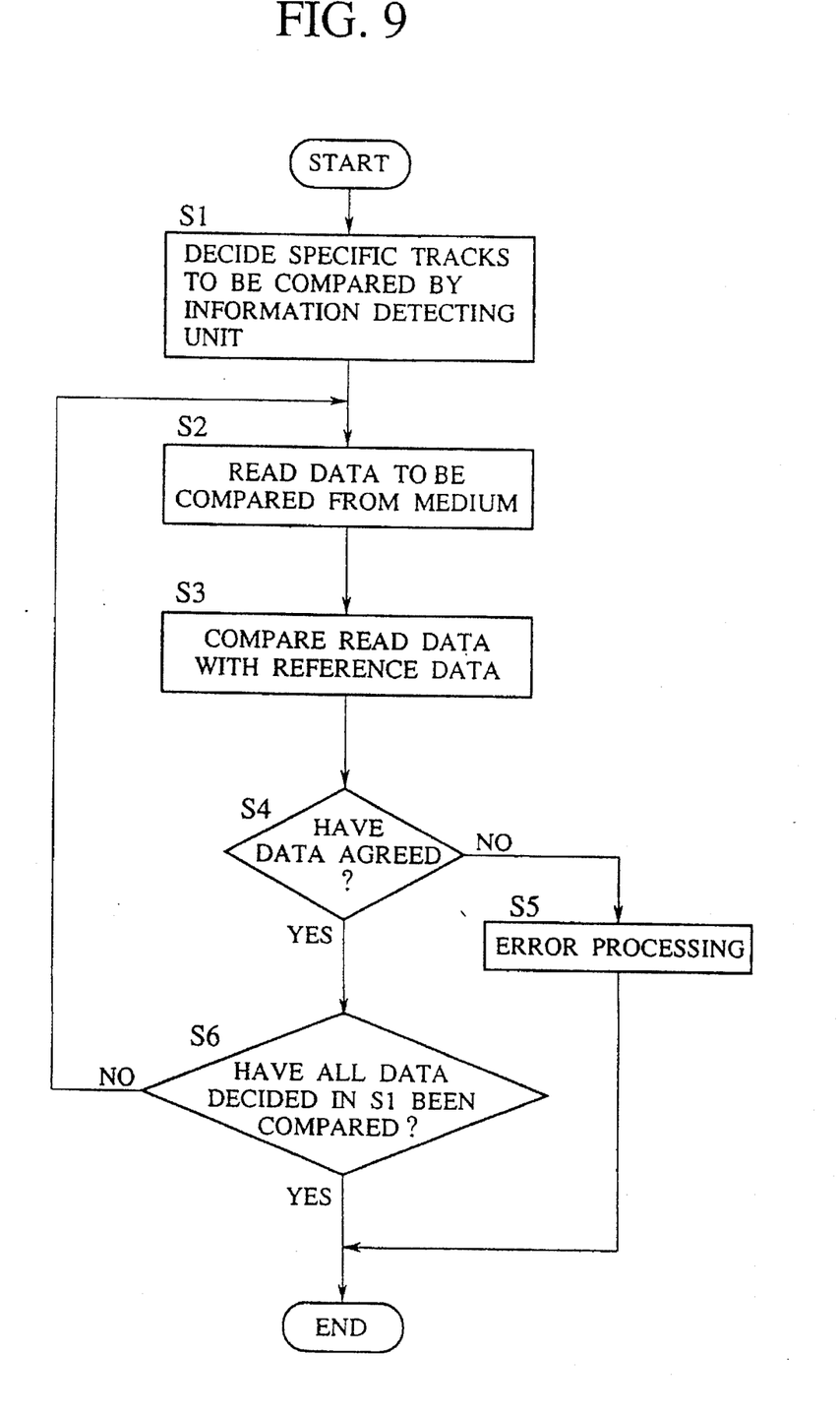
FIG. 9 is a flow chart of the operation of the read unit for the security check according to the present invention.

The operation of the read unit 17 will be explained with reference to the flow chart of FIG. 9.

The game machine 10 is powered on to start the checking operation.

First the information detecting unit 18 determines specific tracks to be compared (Step S1). The specific tracks to be compared for the data A are determined as, for example, Track 1, Track 2, etc. corresponding to random numbers generated by the random number generating circuit 20. Track numbers corresponding to a predetermined number of tracks are selected at random.

Then, a part of the data to be compared is read by the optical pickup 16 from the CD-ROM 12 which is a medium to be checked (Step 2). The optical pickup 16 is moved to a position corresponding to the specific tracks to read information out of pit arrays of the specific tracks.

Subsequently the read data and reference data are compared with each other (Step S3). The information read out of the pit arrays and the reference data D are compared by the comparison unit 19.

Then the comparison unit 19 judges whether or not both data agree to each other (Step S4). When the comparison unit 19 has found disagreement between the read out information and the reference information, the unit 19 judges NO and conducts an error processing (Step S5). And the checking operation is over.

On the other hand, when the read out information and the reference information agree to each other, the unit 19 judges YES, and judges whether or not all the data determined in Step S1 have been compared (Step S6).

A judgement is YES after comparison of all the data to be compared, then the comparison operation is over. A judgement is NO, namely, all the steps of comparison have not been finished, then the step is returned to Step S2 to read data to be compared. This operation is repeated until all of information to be checked have been compared and judged.

When both information agree to each other, the information detecting unit 18 reads program information in the program region 14. When both information disagree to each other, the information detecting unit 18 does not read the program information in the program region 14 or stops the game.

In the above-described checking operation, track numbers to be checked are selected for each checking operation, and concurrently with selection of track numbers, a number of tracks to be checked, on a data amount to be checked, for each checking operation may be varied.

Thus, the reading unit 17 selects at random specific tracks to be compared out of the tracks without checking all the tracks, whereby the checking can be conducted in a short period of time. Furthermore, such shortened time of the checking allows larger data of larger numbers of tracks or larger images to be set as data A to be compared, which improves the security effect.

Since tracks to be checked are changed at the start of every checking operation, data A to be compared stored in the CD-ROM 12 as a medium to be checked must be complete data, i.e., a complete image. In addition, more accurate check is enabled by varying a number of specific tracks for every checking operation.

In a case that a counterfeiter, who wants to fabricate a CD-ROM acceptable in an electronic device or information processing device of an authentic game machine or others, is required to indicate at a predetermined position of the CD-ROM a designated specific indication as data A to be compared corresponding to base data D as a reference or reference information stored in the authentic electronic device or information processing device. If he does, he will be illegally accused as an infringer of a proprietary right.

The designated specific indication is exemplified by a trademark, a logotype, and a tradename protected by Trademark Law, and a design, a mark, an image, etc. protected by Design Law. Designs, marks, images, etc. are protected in some states by Design and Patent Law, Copyright Law, etc.

The reference data D is subjected to information compression processing to reduce a data amount, whereby the read unit 17 occupies a smaller area, and reduces costs.

In the above-described embodiment the region for a specific indication on a CD-ROM to be security-checked is not limited to the position as shown in FIG. 3 and can be varied.

Figure 10A:
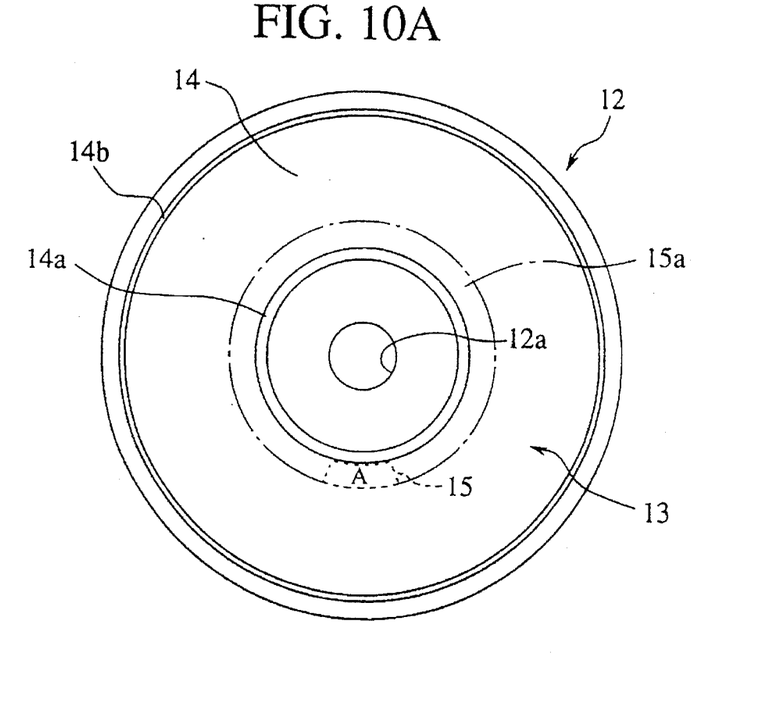

As exemplified in FIG. 10A, a zone 15a in which game program information is not written in is defined inside the program region 14, or an information recording zone, along an inner circumference of the disc, and the region 15 for indicating a specific indication with a set of pits may be formed in the zone 15a.

Figure 10B:
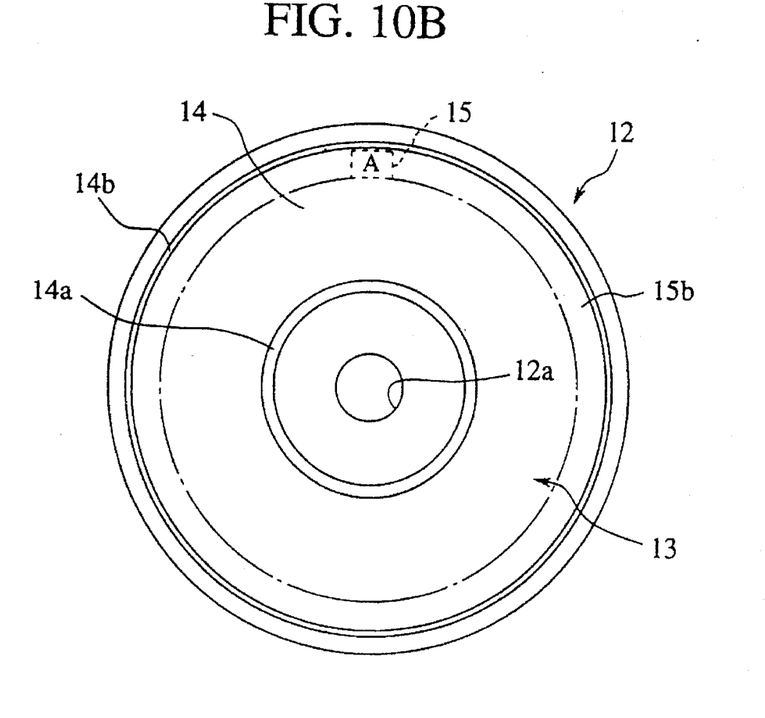

As exemplified in FIG. 10B, a zone 15b in which game program information is not written in is defined outside the program region 14, or an information recording zone, along an outer circumference of the disc, and the region 15 for indicating a specific indication with a set of pits may be formed in the zone 15b.

That is, these zones 15a, 15b are defined as indication forming zones on parts other than the information recording zone, and the region 15 is defined as an indication region in the zone 15a or 15b.

Figure 10C:
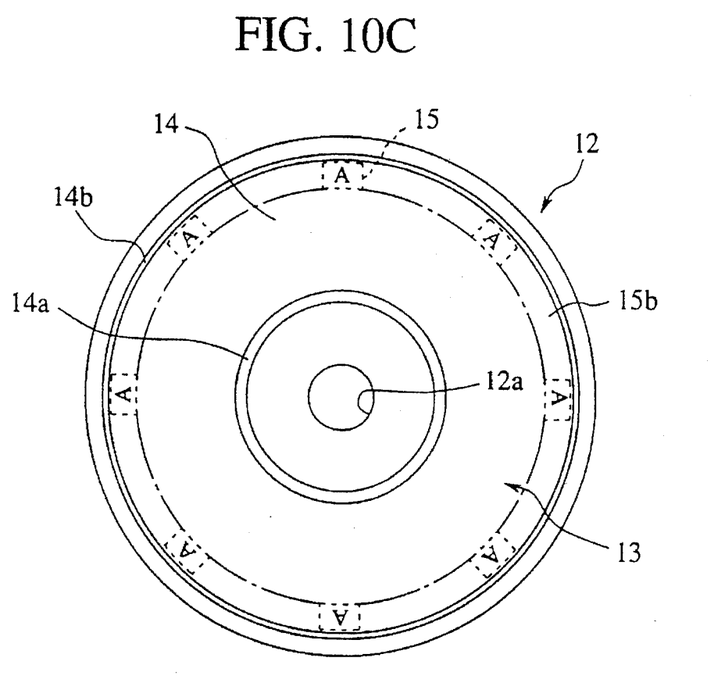

In a variation of FIG. 10C, a plural number of the region 15 may be formed continuously or at a certain interval in the zone 15b. The same specific indication may be indicated in the respective regions 15, or two different indications may be indicated alternately in the respective regions 15.

In this variation, those of the regions 15 may be selected at random as data A to be compared for the checking out of the plural regions 15, based on random numbers generated by the random number generating circuit 20. Combination of the regions 15 at positions selected at random, and tracks in the selected regions selected at random can ensure the security.

Figure 10D:
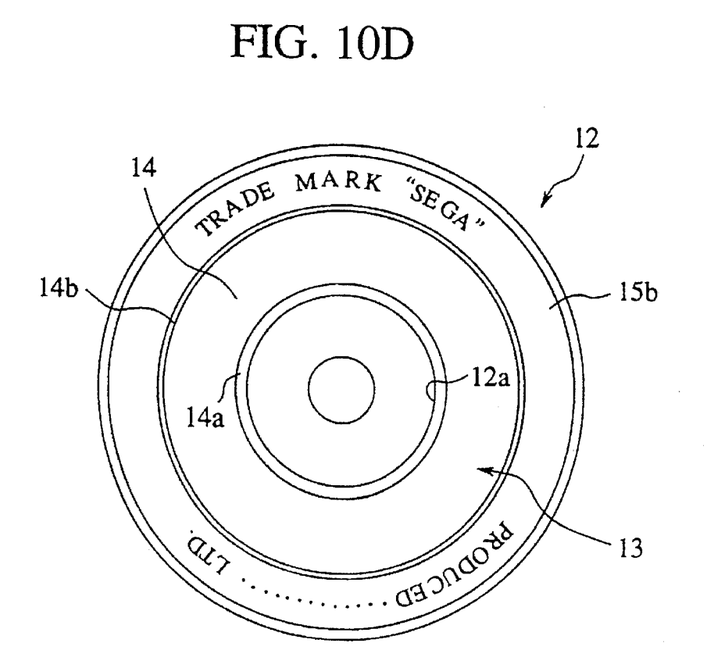

As exemplified in FIG. 10D, the zone 15b may be provided outside the read-out region 14b of the CD-ROM 12, so that the zone 15b can be set exactly separated from the program region 14 storing information, whereby controls for reading the information and for detecting a specific indication can be facilitated.

In the zone 15b, as exemplified in FIG. 10D, images of "TRADE MARK 'SEGA'", "PRODUCED BY or UNDER LICENSE FROM SEGA ENTERPRISES, LTD." is formed with a set of pits.

As a specific indication for the above-described security check, in addition to various letters, pattern, etc., registered trademarks, registered designs, designs, such as characters, etc., protected by copyrights, tradenames, indication marks used by industrial groups, etc. may be used as long as they are identifiable and effectively exclusive. That is, it is preferred that a reference indication is able to hinder an unauthorized person from indicating the same. The reference indication may be owned, or its use may be granted by a license agreement. A plural number of the same indication may be used, or a combination of a plural number of different indications may be used.

Furthermore, an indication formed in the region 15 of the CD-ROM 12 is formed in a visible size and shape, and may be formed in a sector along a peripheral edge of the CD-ROM 12.

INDUSTRIAL APPLICABILITY

The present invention is applicable to security systems for electronic devices for reading information for use from information storage mediums storing game programs, musical softwares, dictionaries, computer programs, etc., especially applicable to security systems for information processing devices for optically reading program information stored in CD-ROMs to play games.

I claim:

1. An electronic device comprising:
   a medium mounting unit on which is detachably mounted an information storage medium having a region formed with a predetermined visual indication, said visual indication having an area size and property which enables it to be visually recognizable as the visual indication;
   a storing means which stores a reference information representative of said predetermined visual indication;
   a detection unit having a selection unit which selects a partial area out of said region and means for detecting said selected partial area to output detected information indicative of the partial area selected out of said predetermined visual indication; and
   a comparison unit comparing said detected information with comparison information in the reference information corresponding to said selected partial area and generating an output of the compared result.

2. An electronic device according to claim 1, wherein said selection unit selects at random said selected partial area.

3. A CD-ROM device comprising:
   a CD-ROM mounting unit on which is detachably mounted a CD-ROM having a region formed with a predetermined visual indication, said visual indication having an area size and a property which enables it to be visually recognizable as the visual indication;
   a storing means which stores a reference information representative of said predetermined visual indication;
   a detection unit having a selection unit which selects at random part of said region and means for detecting said selected part of the region to output information indicative of part selected at random out of said predetermined visual indication; and
   a comparison unit comparing said information with comparison information in the reference information corresponding to said selected part of the region and generating an output of the compared result.

4. An electronic device comprising:
   a disc mounting unit on which is to be detachably mounted a disc having an information recorded region with information recorded with pits and a predetermined region defined over a plurality of tracks;
   a detection unit having a selection unit which selects at least one out of said plurality of tracks and means for detecting the predetermined region on said selected at least one track, said selected at least one track being less in number than said plurality of tracks;
   a storing unit which stores reference information indicative of a specific visual indication which should be formed on said predetermined region, said specific visual indication having an area size and a property which enables it to be visually recognizable as the visual indication when said disc is an authorized one; and
   a judging unit comparing information obtained from the selected at least one track with said reference information to judge whether or not the specific visual indication is indicated visually recognizably on the predetermined region.

5. An electronic device comprising:

a disc mounting unit on which is to be detachably mounted a disc having a region with program information recorded with pits, a predetermined region defined over a plurality of tracks, and a region with a specific visual indication, said visual indication having of an area size and a property which enables it to be visually recognizable as the visual indication and being formed with an aggregation of pits within said predetermined region;

a detection unit having a selection unit which selects at least one of said plurality of tracks and means for detecting said specific visual indication on said selected at least one track, said selected at least one track being less in number than said plurality of tracks;

a storing unit which stores reference information corresponding to said specific visual indication; and a comparison unit comparing the information obtained from said detection unit with said reference information.

6. An electronic device according to claim 4, wherein said selection unit selects at random said at least one track out of said plurality of tracks.

7. An information processing device comprising:

a storing unit which stores reference information corresponding to a specific visual indication the use of which is legally prohibited to a person other than those authorized;

a disc mounting unit on which is to be detachably mounted a disc having an information recorded region with information recorded with pits, and a predetermined region defined over a plurality of tracks on which said specific visual indication is formed, said visual indication being of an area size and a property which enables it to be visually recognizable and being formed with an aggregation of pits;

a selection unit selecting at least one of said tracks at random out of said plurality of tracks, said selected at least one track being less in number than said plurality of tracks;

a detection unit optically detecting information recorded with pits from said predetermined region on said selected at least one track;

a comparison unit comparing the information obtained from said selected at at least one track with said reference information; and a reading unit reading the information in said information recorded region in response to an output from said comparison unit when the information obtained from said selected at least one track agrees to the information in said reference information corresponding to said selected at least one track.

8. An electronic device comprising:

a reference information storing unit which stores reference information representative of a visual indication, a disc mounting unit on which is to be detachably mounted a disc having an information recorded zone with information recorded with pits, an indication forming zone defined different from said information recorded zone, and a plurality of indication regions defined in said indication forming zone, each of said plurality of indication regions having the visual indication, said visual indication being formed of an area size and a property which enables it to be visually recognizable as the visual indication and with an aggregation of pits;

a selection unit selecting at random an indication region out of said plurality of indication regions;

a detection unit optically detecting information indicative of the visual indication recorded with pits in said selected indication region;

a comparison unit comparing the information detected out of said selected indication region with said reference information; and a control unit operable in response to an output from said comparison unit.

9. An electronic device according to claim 8, wherein said selecting unit selects at random specific tracks out of a plurality of tracks forming said specific indication region; and said comparison unit compares the information detected from said specific track with said reference information.

10. An information processing method for checking an authenticity of an information storage medium, comprising the steps of:

mounting the information storage medium on an electronic device, said information storage medium having a region on which a predetermined visual indication is formed, said visual indication having an area size and a property enabling it to be visually recognizable as the visual indication by human eyes as well as of a property enabling it to be optically readable by said electronic device, selecting an area part of said region;

optically detecting said area part of the region so as to output information indicative of the part selected out of said predetermined visual indication on said information storage medium; and comparing the detected information with reference information representative of said predetermined visual indication and stored in said electronic device.

11. An information processing method according to claim 10, wherein the selection of said area part of the region is conducted by selecting said area part at random from the whole area of said region.

12. An electronic device according to claim 5, wherein said selection unit selects at random said at least one track out of said plurality of tracks.

13. A game device comprising:

a disc control means on which is detachably mounted a disc having a first region on which a game program and data is stored and a second region on which a visual indication is formed, said visual indication being of an area size and a property enabling it to be visually recognizable as the visual indication and also having a property enabling it to be readable by the disc control means;

a reference data storing means which stores a reference data representative of said visual indication;

selection means for selecting part of said second region, said selected part being less than the whole area of said second region;

detection means for detecting said selected part to output a data indicative of the selected part of said visual indication;

comparison means for comparing said detected data with said reference data; and a game control means operable in response to an output from said comparison means.

14. A game device of claim 13, wherein said game program and data is recorded with pits so as to be optically readable by said disc control means, and said visual indication is formed with an aggregation of pits so as to be of an area size and a property enabling it to be visually recognizable as the visual indication and of a property enabling it to be optically readable by said disc control means.

15. A game device of claim 14, wherein said disc control means further comprises means for optically reading said visual indication on said selected part and means for optically reading the game program and data in response to the output of said comparison means.

16. A game device of claim 14, wherein said selection means includes means for selecting at random said part of the second region.

17. A game device comprising:

a disc control means on which is detachably mounted a disc having a first region on which a game program and data is stored with pits so as to be optically readable by the disc control means and a second region defined over a plurality of tracks on which a visual indication is formed with an aggregation of pits, said visual indication being of an area size and having a property which enables it to be visually recognizable as the visual indication also having a property enabling it to be optically readable by the disc control means;

a reference data storing means which stores a reference data representative of said visual indication;

selection means for selecting at random at least one of said plurality of tracks, said selected at least one track being less in number than the whole of said plurality of tracks;

detection means for detecting said selected at least one track so as to output detected data representative of part of said visual indication;

comparison means for comparing the detected data with said reference data; and a game control means operable in response to an output from said comparison means.

18. A game device of claim 17, wherein said visual indication is a trademark "SEGA" formed with an aggregation of optically detectable pits so as to be of an area size and a property visually recognizable as the visual trademark of "SEGA" and of a property enabling it to be optically readable by said disc control means.

19. An information storage medium for use with a game device comprising a first region with a game program and data formed with optically readable pits and a second region defined over a plurality of tracks on which a visual indication is formed with an aggregation of pits said visual indication being of an area size and a property which enables it to be visually recognizable as the visual indication and being optically readable so as to allow a game device on which it is mounted to read a data necessary for judging the authenticity of the information storage medium when the game device reads at least one track selected at random out of said plurality of tracks.

20. An information storage medium for use with a game device, the game device comprising a means which stores a reference data representative of a predetermined visual indication and an authenticity judging means including means for comparing a data read from part of said predetermined visual indication, which part is selected at random out of the predetermined visual indication, with said reference data;

said information storage medium comprising a first region with a game program and data stored with pits so as to be optically readable by said game device, and a second region on which the predetermined visual indication is formed with an aggregation of pits, said visual indication being of an area size and a property which enables it to be visually recognizable as the visual indication and which also allows the game device to read data necessary for judging the authenticity of the information storage medium when the game device reads the randomly selected part of said predetermined visual indication.

21. An information storage medium of claim 20, wherein the predetermined visual indication is at least one of a trademark, a logotype, a tradename, a mark, a letter, a pattern, a design, an image, a character and a message.

22. An information storage medium of claim 20, wherein the information storage medium is a CD-ROM and said predetermined visual indication is of a trademark formed with an aggregation of optically detectable pits at an outer circumference of the CD-ROM so as to be of an area size and a property which is visually recognizable as the trademark as well as of a nature readable by the game device.

23. An information storage medium of claim 22, wherein said trademark is a trademark of "SEGA".

24. An information storage medium of claim 22, wherein said predetermined visual indication is a trademark of "SEGA" formed with an aggregation of optically detectable pits.

25. An electronic device according to any one of claims 1 and 3, wherein said predetermined visual indication is located within an information recording region of said information storage medium.

26. An electronic device according to any one of claims 1 and 3, wherein said predetermined visual indication is located outside of an information recording region of said information storage medium.

27. An electronic device according to any one of claims 4, 5 and 7, wherein said specific visual indication is located within an information recording region of said disc.

28. An electronic device according to any one of claims 4, 5 and 7, wherein said specific visual indication is located outside of an information recording region of said information storage region.

29. An electronic device according to any one of claims 1 and 3, wherein said predetermined visual indication is visible from the underside surface of the information storage medium.

30. An electronic device according to any one of claims 1 and 3, wherein said predetermined visual indication is visible from the top surface of the information storage medium.

31. An electronic device according to any one of claims 1 and 3, wherein said predetermined visual indication is an indicator of an authentic source of origin of said information storage medium.

32. An electronic device according to claim 31, wherein said predetermined visual indication information is a trademark.

* * * * *

UNITED STATES PATENT AND TRADEMARK OFFICE
CERTIFICATE OF CORRECTION

PATENT NO. : 5,627,895
DATED : May 6, 1997
INVENTOR(S) : Hidetaka Owaki

It is certified that error appears in the above-indentified patent and that said Letters Patent is hereby corrected as shown below:

TITLE PAGE

Please add:

--Foreign Application Priority Data

Nov. 29, 1993 [JP] Japan ................... 05-298727--.

In the PCT Pub. Date:

"Nov. 29, 1993" should read --Nov. 29, 1995--.

Signed and Sealed this

Twenty-sixth Day of October, 1999

Attest:

Q. TODD DICKINSON

Attesting Officer

Acting Commissioner of Patents and Trademarks